(12) United States Patent
Binek et al.

(10) Patent No.: US 12,264,624 B2
(45) Date of Patent: Apr. 1, 2025

(54) BUILD PLATE INTEGRATED INTO ADDITIVE MANUFACTURED COMPONENT

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: RTX Corporation, Farmington, CT (US)

( * ) Notice: Subject to any disclaimer, the term of this patent is extended or adjusted under 35 U.S.C. 154(b) by 30 days.

(21) Appl. No.: 17/837,691

(22) Filed: Jun. 10, 2022

(65) Prior Publication Data

US 2023/0399977 A1    Dec. 14, 2023

(51) Int. Cl.

| B64D 27/14 | (2006.01) |
|---|---|
| B22F 5/00 | (2006.01) |
| B22F 10/28 | (2021.01) |
| B22F 10/66 | (2021.01) |
| B33Y 10/00 | (2015.01) |
| B33Y 40/20 | (2020.01) |
| B33Y 80/00 | (2015.01) |
| B64C 1/10 | (2006.01) |
| B64D 33/00 | (2006.01) |
| F02C 7/04 | (2006.01) |

(52) U.S. Cl.
CPC .............. *F02C 7/04* (2013.01); *B22F 5/009* (2013.01); *B22F 10/28* (2021.01); *B22F 10/66* (2021.01); *B33Y 10/00* (2014.12); *B33Y 40/20* (2020.01); *B33Y 80/00* (2014.12); *B64C 1/10* (2013.01); *B64D 27/14* (2013.01); *B64D 33/00* (2013.01); *F05D 2220/323* (2013.01)

(58) Field of Classification Search
CPC .. F02C 7/04; B22F 5/009; B22F 10/28; B22F 10/66; B22F 10/47; B22F 2998/10; B33Y 10/00; B33Y 40/20; B33Y 80/00; B33Y 30/00; B64C 1/10; B64D 27/14; B64D 33/00; B64D 27/20; F05D 2220/323; B64F 5/10; B64U 50/12; B29C 64/153; B29C 64/188; B29C 64/245
See application file for complete search history.

(56) References Cited

U.S. PATENT DOCUMENTS

| 11,199,136 B2 | 12/2021 | Butcher |  |
|---|---|---|---|
| 2019/0091923 A1* | 3/2019 | Abe | B33Y 30/00 |
| 2019/0308242 A1* | 10/2019 | Matsumoto | B22F 10/28 |
| 2020/0102844 A1* | 4/2020 | Binek | F01D 5/147 |

(Continued)

FOREIGN PATENT DOCUMENTS

| CN | 213627697 U | 7/2021 |
|---|---|---|
| EP | 2962836 B1 | 4/2021 |

OTHER PUBLICATIONS

GB Search and Examination Report for GB Patent Application 2308633.3 dated Dec. 6, 2023.

*Primary Examiner* — Rebecca Janssen
(74) *Attorney, Agent, or Firm* — Getz Balich LLC

(57) ABSTRACT

During a formation method, a build plate is arranged within a build space. A first object is built onto the build plate within the build space using an additive manufacturing process. The object is fused to the build plate during the additive manufacturing process. At least the build plate is machined to form a component that includes a portion of the build plate and at least a portion of the first object.

20 Claims, 8 Drawing Sheets

(56) References Cited

U.S. PATENT DOCUMENTS

| | | |
|---|---|---|
| 2020/0191053 A1 | 6/2020 | Butcher |
| 2020/0386160 A1 | 12/2020 | Binek |
| 2022/0111439 A1* | 4/2022 | Foes .................. B22F 7/08 |

* cited by examiner

BUILD PLATE INTEGRATED INTO ADDITIVE MANUFACTURED COMPONENT

BACKGROUND OF THE DISCLOSURE

1. Technical Field

This disclosure relates generally to a vehicle such as an aircraft and, more particularly, to components of the vehicle and methods for forming the vehicle components.

2. Background Information

An aircraft may include a gas turbine engine housed within an aircraft body. Various types and configurations of gas turbine engines and aircraft bodies are known in the art. Various manufacturing methods are also known in the art for forming a gas turbine engine component and an aircraft body component. While these known structures and manufacturing methods have various benefits, there is still room in the art for improvement.

SUMMARY OF THE DISCLOSURE

According to an aspect of the present disclosure, a formation method is provided. During this formation method, a build plate is arranged within a build space. A first object is built onto the build plate within the build space using an additive manufacturing process. The object is fused to the build plate during the additive manufacturing process. At least the build plate is machined to form a component that includes a portion of the build plate and at least a portion of the first object.

According to another aspect of the present disclosure, an assembly is provided for an aircraft. This aircraft assembly includes an aircraft body, a gas turbine engine and a support structure. The gas turbine engine includes an engine case. The gas turbine engine is housed within the aircraft body. The support structure extends between and is connected to the aircraft body and the engine case. The support structure supports the gas turbine engine within the aircraft body. The support structure and the engine case are included in a monolithic body.

According to still another aspect of the present disclosure, another assembly is provided for an aircraft. This aircraft assembly includes an intake section for a gas turbine engine, and a bulkhead. The intake section includes an outer flowpath wall, an inner flowpath wall and a plurality of vanes connected to and extending between the inner flowpath wall and the outer flowpath wall. The bulkhead projects out from the intake section. The bulkhead is formed integral with the intake section as a single, unitary body.

The engine case may form an outer flowpath wall. The gas turbine engine may also include an inner flowpath wall and a plurality of vanes connected to and extending between the inner flowpath wall and the outer flowpath wall. The inner flowpath wall and the vanes may also be included in the monolithic body.

The building of the object may include building the first object layer-by-layer onto the build plate using the additive manufacturing process.

The additive manufacturing process may be or otherwise include a powder bed fusion process.

The building of the first object may include: disposing a first layer of powder onto the build plate within the build space; and selectively solidifying the first layer of powder using an energy beam to form a first portion of the first object that is fused to the build plate.

The building of the first object may also include: disposing a second layer of powder within the build space; and selectively solidifying the second layer of powder using the energy beam to form a second portion of the first object that is fused to the first portion of the first object.

The formation method may also include building a second object onto the build plate within the build space using the additive manufacturing process. The second object may be fused to the build plate during the additive manufacturing process. The component may also include at least a portion of the second object.

The second object may be discrete form the first object.

The build plate may structurally connect the second object to the first object.

The second object may circumscribe and may be spaced radially outboard from the first object.

The at least a portion of the first object may form a part of a gas turbine engine. The at least a portion of the second object may form a part of a vehicle body in which the gas turbine engine is housed. The portion of the build plate may form a support structure extending between and connected to the gas turbine engine and the vehicle body.

The part of the gas turbine engine may be configured as or otherwise include an inlet section of the gas turbine engine.

The at least a portion of the first object may form a part of a gas turbine engine case. The portion of the build plate may form a bulkhead projecting radially out from the gas turbine engine case.

The machining may include removing a bottom portion of the build plate from the build plate to provide a second build plate that is discrete from the component. The second build plate may be arranged within the build space. A second object may be built onto the second build plate within the build space using the additive manufacturing process. The second object may be fused to the second build plate. At least the second build plate may be machined to form a second component that includes a portion of the second build plate and at least a portion of the second object.

The machining may include removing a peripheral portion of the build plate to form an outer peripheral boundary of the component.

The machining may include forming one or more apertures into the build plate.

The build plate may be configured from or otherwise include build plate material. The first object may be configured from or otherwise include object material that is different than the build plate material.

The build plate and the first object may be configured from or otherwise include a common material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
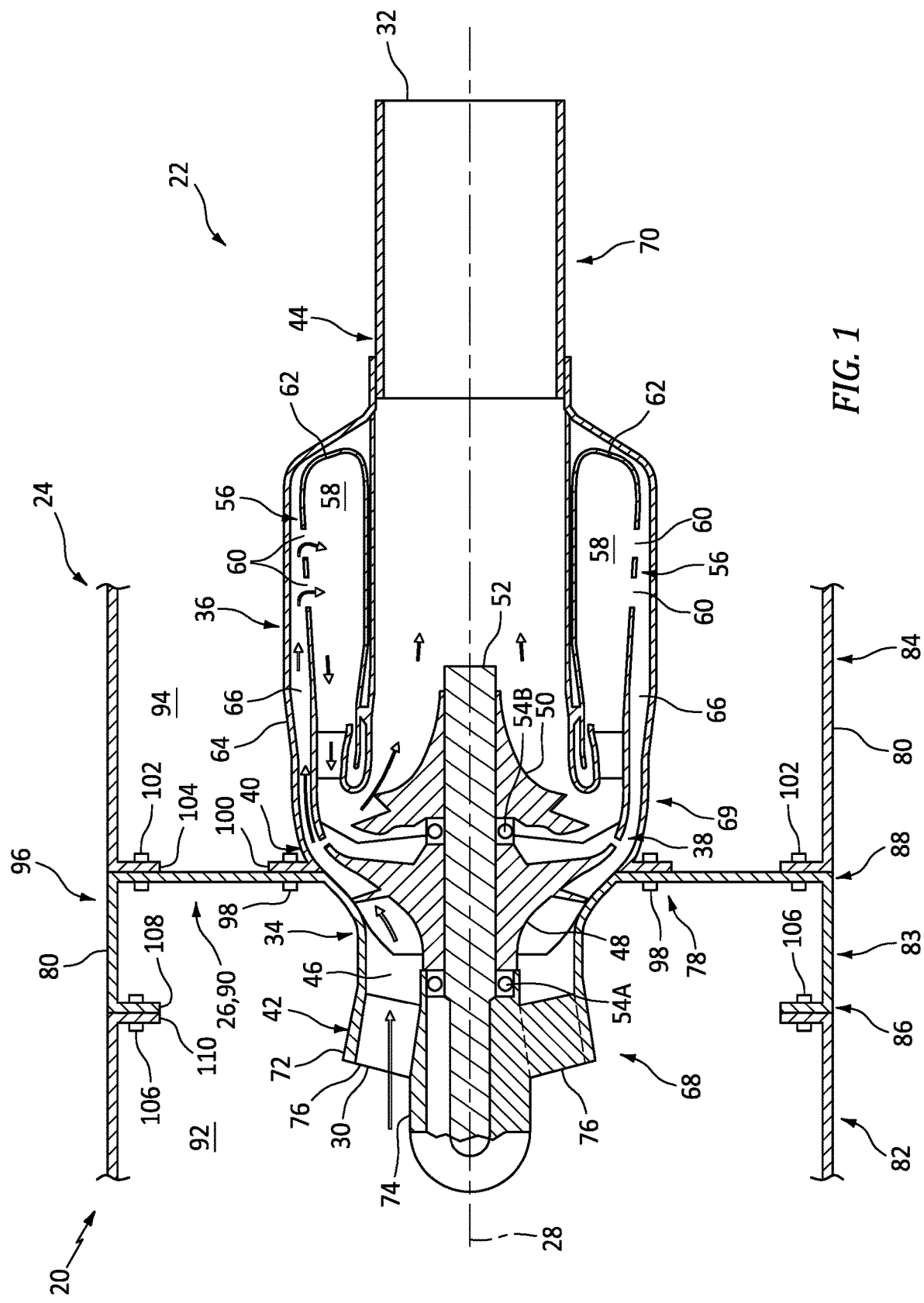
FIG. 1 is a partial side sectional illustration of an assembly for a vehicle such as an aircraft.

FIG. 1 illustrates an assembly 20 for a vehicle such as, but not limited to, an unmanned aerial vehicle (UAV), a drone or any other manned or unmanned aircraft or self-propelled projectile. The vehicle assembly 20 of FIG. 1 includes a gas turbine engine 22, a vehicle body 24 and an engine support structure 26 coupling the gas turbine engine 22 to the vehicle body 24.

The gas turbine engine 22 of FIG. 1 is configured as a single spool, radial-flow turbojet gas turbine engine. This gas turbine engine 22 is configured for propelling the vehicle. The present disclosure, however, is not limited to such an exemplary turbojet gas turbine engine configuration nor to a vehicle propulsion system application. For example, the gas turbine engine 22 may alternatively be configured as an auxiliary power unit (APU) for the vehicle.

The gas turbine engine 22 of FIG. 1 extends axially along an axial centerline 28 between a forward, upstream airflow inlet 30 and an aft, downstream exhaust 32. This axial centerline 28 may be a centerline axis of the gas turbine engine 22, the vehicle body 24 and/or the support structure 26. The axial centerline 28 may also or alternatively be a rotational axis for one or more components within the gas turbine engine 22.

The gas turbine engine 22 includes a compressor section 34, a combustor section 36 and a turbine section 38. The gas turbine engine 22 also includes a static engine structure 40. This static engine structure 40 houses the compressor section 34, the combustor section 36 and the turbine section 38. The static engine structure 40 of FIG. 1 also forms an inlet section 42 and an exhaust section 44 for the gas turbine engine 22, where the inlet section 42 forms the airflow inlet 30 and the exhaust section 44 form the exhaust 32.

The engine sections 42, 34, 36, 38 and 44 are arranged sequentially along a core flowpath 46 that extends through the gas turbine engine 22 from the airflow inlet 30 to the exhaust 32. Each of the engine sections 34 and 38 includes a respective bladed rotor 48 and 50. Each of these bladed rotors 48 and 50 includes a plurality of rotor blades arranged circumferentially around and connected to at least one respective rotor disk. The rotor blades, for example, may be formed integral with or mechanically fastened, welded, brazed, adhered and/or otherwise attached to the respective rotor disk(s).

The compressor rotor 48 may be configured as a radial flow rotor. The turbine rotor 50 may also or alternatively be configured as a radial flow rotor. The compressor rotor 48 is connected to the turbine rotor 50 through an engine shaft 52. This engine shaft 52 is rotatably supported by the static engine structure 40 through a plurality of bearings 54A and 54B (generally referred to as 54); e.g., rolling element bearings, journal bearings, etc.

The combustor section 36 includes an annular combustor 56 with an annular combustion chamber 58. The combustor 56 of FIG. 1 is configured as a reverse flow combustor. Inlets ports 60/flow tubes into the combustion chamber 58, for example, may be arranged at (e.g., on, adjacent or proximate) and/or towards an aft bulkhead wall 62 of the combustor 56. An outlet from the combustor 56 may be arranged axially aft of an inlet to the turbine section 38. The combustor 56 may also be arranged radially outboard of and/or axially overlap at least a (e.g., aft) portion of the turbine section 38. With this arrangement, the core flowpath 46 of FIG. 1 reverses its directions (e.g., from a forward-to-aft direction to an aft-to-forward direction) a first time as the flowpath 46 extends from a diffuser plenum 66 surrounding the combustor 56 into the combustion chamber 58. The core flowpath 46 of FIG. 1 then reverses its direction (e.g., from the aft-to-forward direction to the forward-to-aft direction) a second time as the flowpath extends from the combustion chamber 58 into the turbine section 38.

During operation, air enters the gas turbine engine 22 through the inlet section 42 and its airflow inlet 30. The inlet section 42 directs this air from the airflow inlet 30 into the core flowpath 46 and the compressor section 34. The airflow inlet 30 of FIG. 1 thereby forms a forward, upstream inlet to the core flowpath 46 and the compressor section 34. The air within the core flowpath 46 may be referred to as core air.

The core air is compressed by the compressor rotor 48 and directed through a diffuser 64 and its plenum 66 into the combustion chamber 58. Fuel is injected and mixed with the compressed core air to provide a fuel-air mixture. This fuel-air mixture is ignited within the combustion chamber 58, and combustion products thereof flow through the turbine section 38 and cause the turbine rotor 50 to rotate. This rotation of the turbine rotor 50 drives rotation of the compressor rotor 48 and, thus, compression of the air received from the airflow inlet 30. The exhaust section 44 receives the combustion products from the turbine section 38. The exhaust section 44 directs the received combustion products out of the gas turbine engine 22 to provide forward engine thrust.

The static engine structure 40 of FIG. 1 includes a plurality of sections 68-70. The first static structure section 68 may be configured as a forward, upstream section of the static engine structure 40. The first static structure section 68 of FIG. 1, for example, includes the inlet section 42. This first static structure section 68 may also include at least a portion of the static engine structure 40 that houses a forward, upstream portion of the compressor section 34 and its compressor rotor 48. The second static structure section 69 may be configured as an intermediate section of the static engine structure 40. The second static structure section 69 of FIG. 1, for example, includes at least a portion of the static engine structure 40 that forms the combustor section 36 and its combustor 56 and that houses the turbine section 38 and its turbine rotor 50. The second static structure section 69 may also include at least a portion of the static engine structure 40 that houses an aft, downstream portion of the compressor section 34 and its compressor rotor 48. The third static structure section 70 may be configured as an aft, downstream section of the static engine structure 40. The third static structure section 70 of FIG. 1, for example, includes the exhaust section 44.

The first static structure section 68 of FIG. 1 includes an outer engine case 72, an inner engine case 74 and a plurality of vanes 76. The outer engine case 72 extends axially along the axial centerline 28 between and to a forward, upstream end of the outer engine case 72 and an aft, downstream end of the outer engine case 72. The airflow inlet 30 is disposed at the outer case forward, upstream end. The second static structure section 69 is attached to the first static structure section 68 at the outer case aft, downstream end through, for example, a mechanical joint 78; e.g., a bolted flange coupling. The outer engine case 72 extends circumferentially about (e.g., completely around) the axial centerline 28 providing the outer engine case 72 with, for example, a tubular geometry. This outer engine case 72 may be configured as an outer flowpath wall. The outer engine case 72 of FIG. 1, for example, forms an outer peripheral boundary for a forward, upstream portion of the core flowpath 46 through the inlet section 42 and into the compressor section 34.

The inner engine case 74 extends axially along the axial centerline 28 between and to a forward, upstream end of the inner engine case 74 and an aft, downstream end of the inner engine case 74. The inner engine case 74 extends circumferentially about (e.g., completely around) the axial centerline 28 providing the inner engine case 74 with, for example, a tubular geometry. This inner engine case 74 may be configured as an inner flowpath wall. The inner engine case 74 of FIG. 1, for example, forms an inner peripheral boundary for the forward, upstream portion of the core flowpath 46 through the inlet section 42 and to (or into) the compressor section 34. The inner engine case 74 may also provide a support structure for one of the bearings (e.g., 54A).

The vanes 76 are arranged circumferentially about the axial centerline 28 in an annular array. Each of the vanes 76 is radially between the inner engine case 74 and the outer engine case 72. Each vane 76 of FIG. 1, for example, extends radially through the core flowpath 46 from the inner engine case 74 to the outer engine case 72. Each vane 76 is also connected to the inner engine case 74 and the outer engine case 72.

Figure 2:
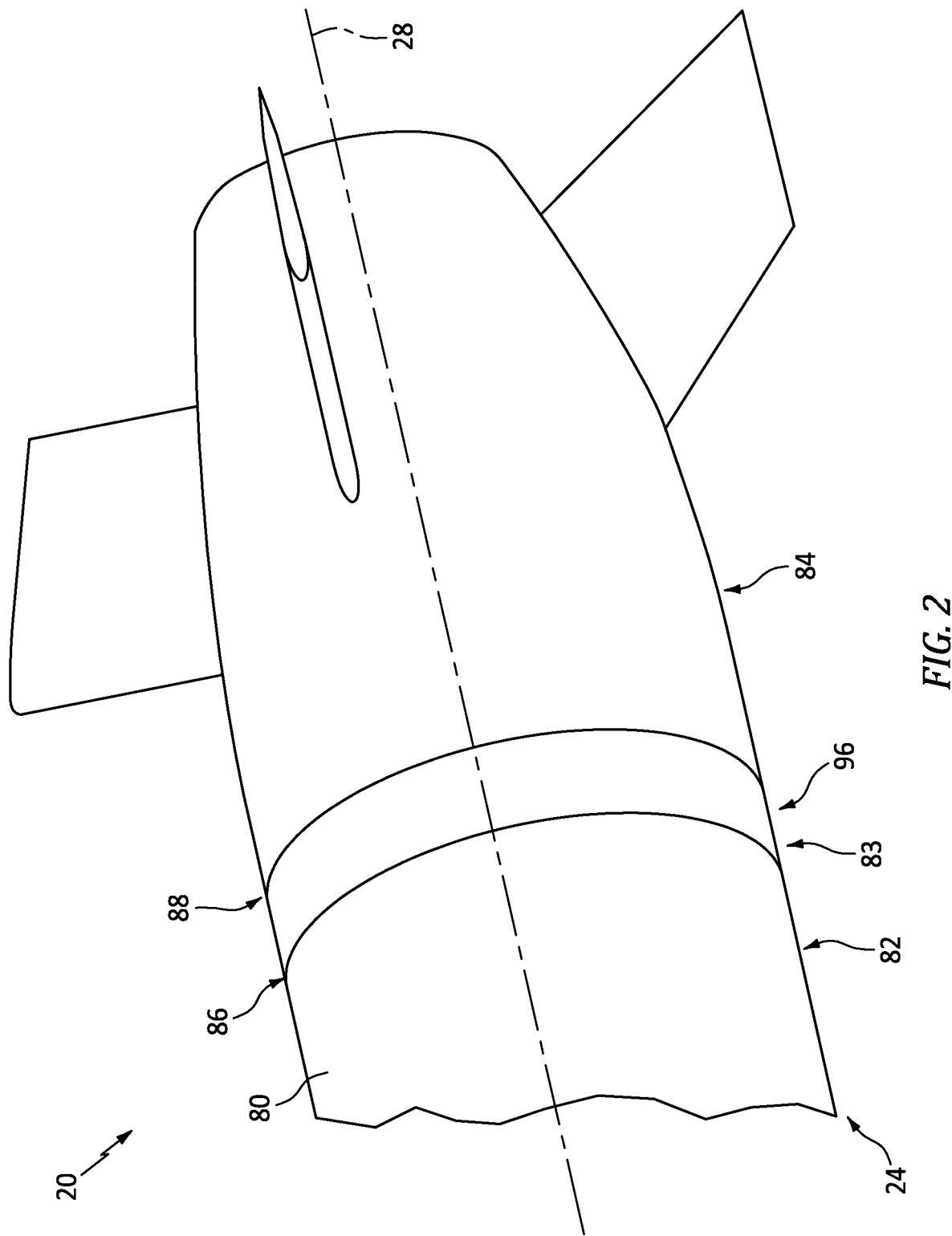
FIG. 2 is a perspective illustration of a portion of a vehicle body.

The vehicle body 24 is configured to house the gas turbine engine 22. The vehicle body 24 may also be configured to form an outer aerodynamic surface 80 for the vehicle; see also FIG. 2. The vehicle body 24, for example, may be configured as a nacelle for the gas turbine engine 22 and/or a fuselage for the vehicle.

The vehicle body 24 of FIG. 1 includes a plurality of sections 82-84. The first body section 82 may be configured as a forward, upstream section of the vehicle body 24. The second body section 83 may be configured as an intermediate section of the vehicle body 24. The third body section 84 may be configured as an aft, downstream section of the vehicle body 24.

Each of the body sections 82-84 extends circumferentially about (e.g., completely around) the axial centerline 28 providing that respective body section with a tubular geometry. Each of the body sections 82-84 of FIG. 1 also extends circumferentially about (e.g., circumscribe) and axially along (e.g., overlap) the gas turbine engine 22. The second body section 83, in particular, extends axially along the axial centerline 28 between a forward, upstream end of the second body section 83 and an aft, downstream end of the second body section 83. The first body section 82 is attached to the second body section 83 at the second body section forward, upstream end through, for example, a mechanical joint 86; e.g., a bolted flange coupling. The third body section 84 is attached to the second body section 83 at the second body section aft, downstream end through, for example, a mechanical joint 88; e.g., a bolted flange coupling.

The support structure 26 is configured to support and locate the gas turbine engine 22 within the vehicle body 24. The support structure 26 is configured to facilitate attachment of the first static structure section 68 to the second static structure section 69 at the mechanical joint 78. The support structure 26 is also configured to facilitate attachment of the second body section 83 to the third body section 84 at the mechanical joint 88.

The support structure 26 of FIG. 1 is configured as a bulkhead 90. This bulkhead 90 structurally ties the gas turbine engine 22 and its static engine structure 40 to the vehicle body 24. The bulkhead 90 also divides an internal volume within the vehicle body 24 into a first cavity 92 and a second cavity 94. More particular, the bulkhead 90 provides a firewall and/or heat shield between the first cavity 92 and the second cavity 94. Sensitive components (e.g., electronics) and fuel (e.g., a fuel reservoir) may thereby be located/stored within (or forward, upstream of) the first cavity 92, while a hot section of the gas turbine engine 22 (e.g., the engine sections) may be located within (or aft, downstream of) the second cavity 94.

The support structure 26 extends radially between the gas turbine engine 22 and the vehicle body 24. The support structure 26 of FIG. 1, for example, projects radially out from the static engine structure 40 and its first static structure section 68 to the second body section 83. The support structure 26 extends circumferentially about (e.g., completely around) the axial centerline 28 and the gas turbine engine 22 providing the support structure 26 with, for example, a full-hoop geometry. The support structure 26 is also connected to the first static structure section 68 and the second body section 83. The support structure 26 of FIG. 1, in particular, is formed integral with at least (or only) the first static structure section 68 and/or the second body section 83 to provide a single, unitary component 96; e.g., a monolithic body. Providing this unitary vehicle component 96 reduces mechanical connections within the vehicle, reduces design complexity of the vehicle and/or improves sealing/shielding between the first cavity 92 and the second cavity 94.

A plurality of fasteners 98 (e.g., bolts) project axially through the support structure 26 and an (e.g., annular) outer flange 100 on the second static structure section 69 to secure the first static structure section 68 and the second static structure section 69 together at the mechanical joint 78. A plurality of fasteners 102 (e.g., bolts) project axially through the support structure 26 and an (e.g., annular) inner flange 104 on the third body section 84 to secure the second body section 83 and the third body section 84 together at the mechanical joint 88. Similarly, a plurality of fasteners 106 (e.g., bolts) project axially through an (e.g., annular) inner flange 108 on the second body section 83 and an (e.g., annular) inner flange 110 on the first body section 82 to secure the second body section 83 and the first body section 82 together at the mechanical joint 86.

Figure 3:
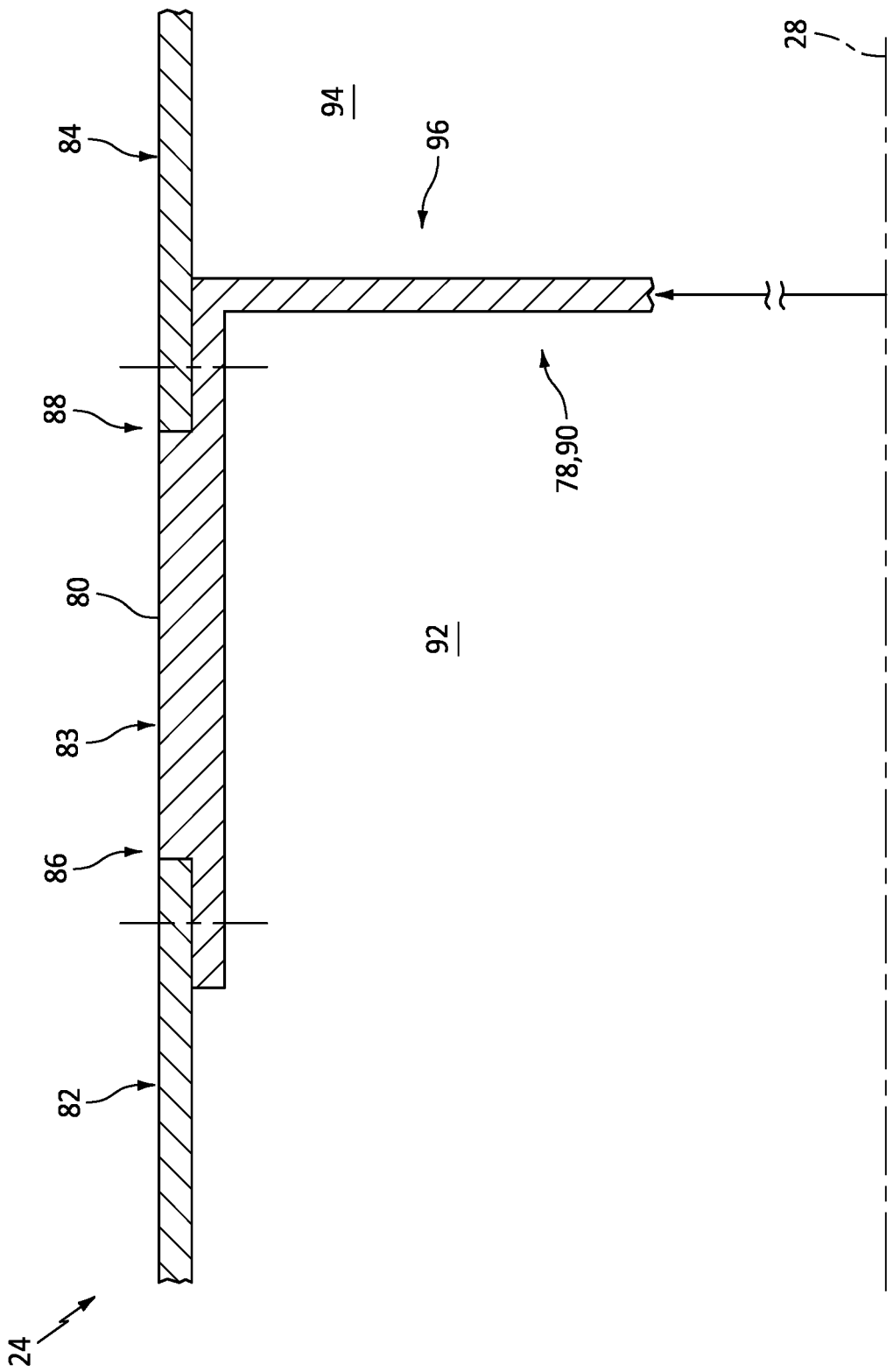
FIG. 3 is a partial side sectional illustration at a connection between the vehicle body and an internal support structure.

In some embodiments, the second body section 83 may axially abut against another one of the body sections 82, 84 at the mechanical joint 86, 88 therebetween. In other embodiments, referring to FIG. 3, the second body section 83 may alternatively radially abut against and/or axially slide under (or over) another one of the body sections 82, 84 at the mechanical joint 86, 88 therebetween. Of course, various other types of mechanical joints are known in the art, and the present disclosure is not limited to any particular ones thereof.

In some embodiments, referring to FIG. 1, each element 26, 68 and 83 of the vehicle component 96 may be constructed from a common (e.g., the same) material. This material may be a metal such as, but not limited to, steel, titanium (Ti), titanium alloy, aluminum (Al) or aluminum alloy. In other embodiments, however, the vehicle component 96 may be constructed from multiple materials; e.g., metals. The support structure 26, for example, may be constructed from a first material. The first static structure section 68 and/or the second body section 83 may be constructed from a second material that is different than the first material. The first and the second materials, however, are selected for compatibility such that the second material may be bonded to the first material.

Figure 4:
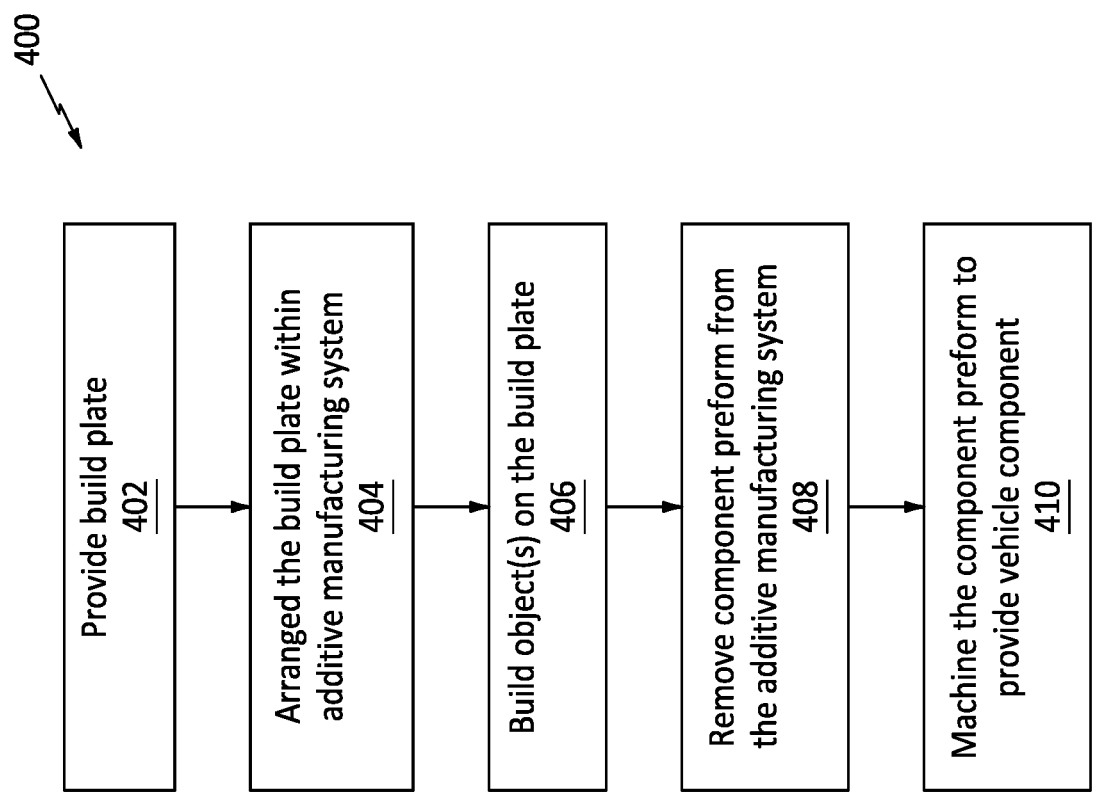
FIG. 4 is a flow diagram of a method for forming a component.

FIG. 4 is a flow diagram of a method 400 for forming a component. For ease of description, the component is described below as the vehicle component 96 described above. The formation method 400 of the present disclosure, however, is not limited to forming such an exemplary component. Rather, the formation method 400 of the present disclosure may be used for forming any component of the vehicle (or another apparatus).

Figure 5:
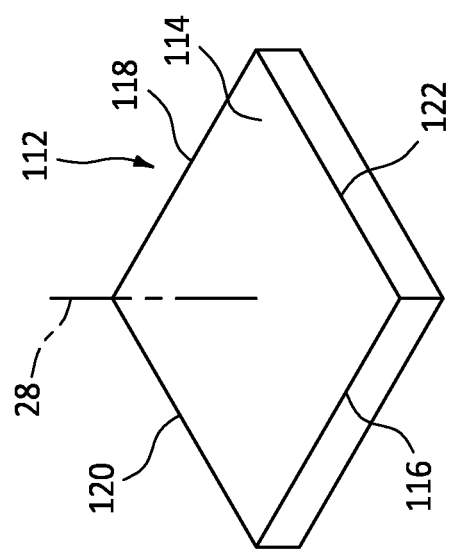
FIG. 5 is a perspective illustration of a build plate.

In step 402, a build plate 112 is provided as shown, for example, in FIG. 5. This build plate 112 extends vertically (e.g., upwards relative to gravity) to a top support surface 114 of the build plate 112. The support surface 114 of FIG. 5 is a (e.g., uninterrupted) planar (e.g., flat) surface. The build plate 112 and its support surface 114 extend horizontally in a first direction between and to opposing first sides 116 and 118 of the build plate 112. The build plate 112 and its support surface 114 extend horizontally in a second direction between and to opposing second sides 120 and 122 of the build plate 112. The support surface 114 of FIG. 5 has a polygonal (e.g., square or rectangular) geometry when viewed, for example, in a reference plane parallel with the plate top surface and/or perpendicular to the axial centerline 28 of the component being formed; e.g., see FIG. 6. The present disclosure, however, is not limited to any particular build plate geometries.

The build plate 112 may be provided using various manufacturing processes. The build plate 112, for example, may be cast, forged, machined from a billet of material and/or otherwise formed. Using such manufacturing processes, the build plate 112 may be formed separate from (e.g., outside of, independent from, without using) an additive manufacturing system 124 as described below (see FIG. 6). The formation method 400 of the present disclosure, however, is not limited to the foregoing exemplary manufacturing processes.

Figure 6:
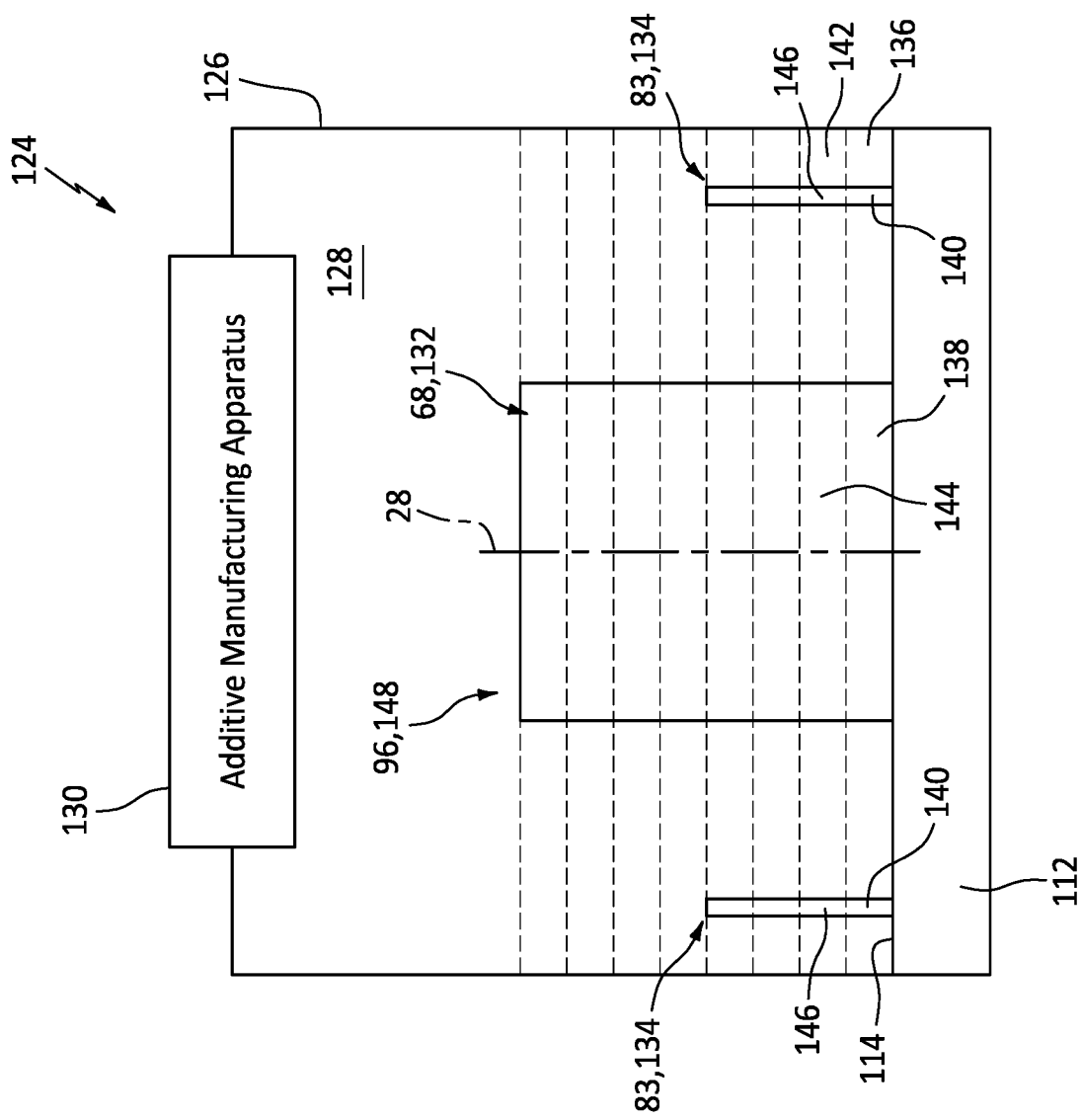
FIG. 6 is a schematic illustration of an additive manufacturing system for forming the component.

In step 404, the build plate 112 is arranged with the additive manufacturing system 124 as shown, for example, in FIG. 6. The additive manufacturing system 124 of FIG. 6 includes a build chamber 126 defining a build space 128 for building one or more portions of the vehicle component 96; e.g., the first static structure section 68 and/or the second body section 83. The additive manufacturing system 124 also includes an additive manufacturing apparatus 130 such as an energy beam powder bed fusion apparatus. Examples of the energy beam powder bed fusion apparatus include a laser beam powder bed fusion (LPBF) apparatus and an electron beam powder bed fusion (EBPBF) apparatus. The build plate 112 is disposed within the build chamber 126 and forms a lower boundary of the build space 128.

In step 406, one or more objects 132 and 134 are (e.g., concurrently) built using an additive manufacturing process. More particularly, the objects 132 and 134 are built onto the build plate 112 within the build space 128 in a layer-by-layer fashion using the additive manufacturing apparatus 130. For example, the additive manufacturing apparatus 130 may deposit a first layer 136 of powder over the support surface 114 within the build space 128. The additive manufacturing apparatus 130 may thereafter selectively solidify (e.g., sinter, fuse, melt, etc.) a select portion of the powder in the first layer 136 using an energy beam (e.g., a laser beam or an electron beam) to form a first portion 138, 140 (e.g., layer, slice) of each object 132, 134. Each solidified first portion 138, 140 is also fused to the build plate 112 at the support surface 114 by the solidifying of the powder in the first layer 136. The additive manufacturing apparatus 130 may then deposit a second layer 142 of powder over the selectively sintered first layer 136 of powder within the build space 128. The additive manufacturing apparatus 130 may thereafter again selectively solidify a select portion of the powder in the second layer 142 using the energy beam to form a second portion 144, 146 (e.g., layer, slice) of each object 132, 134. Each solidified second portion 144, 146 is also fused to the respective underlining solidified first portion 138, 140 by the solidifying of the powder in the second layer 142. This process may be repeated one or more times until the objects 132 and 134 are (e.g., completely, entirely) formed on and fused to the build plate 112.

The first object 132 in FIG. 6 may be (or may be a preform of) the first static structure section 68. The second object 134 in FIG. 6 may be (or may be a preform of) the second body section 83.

Figure 7:
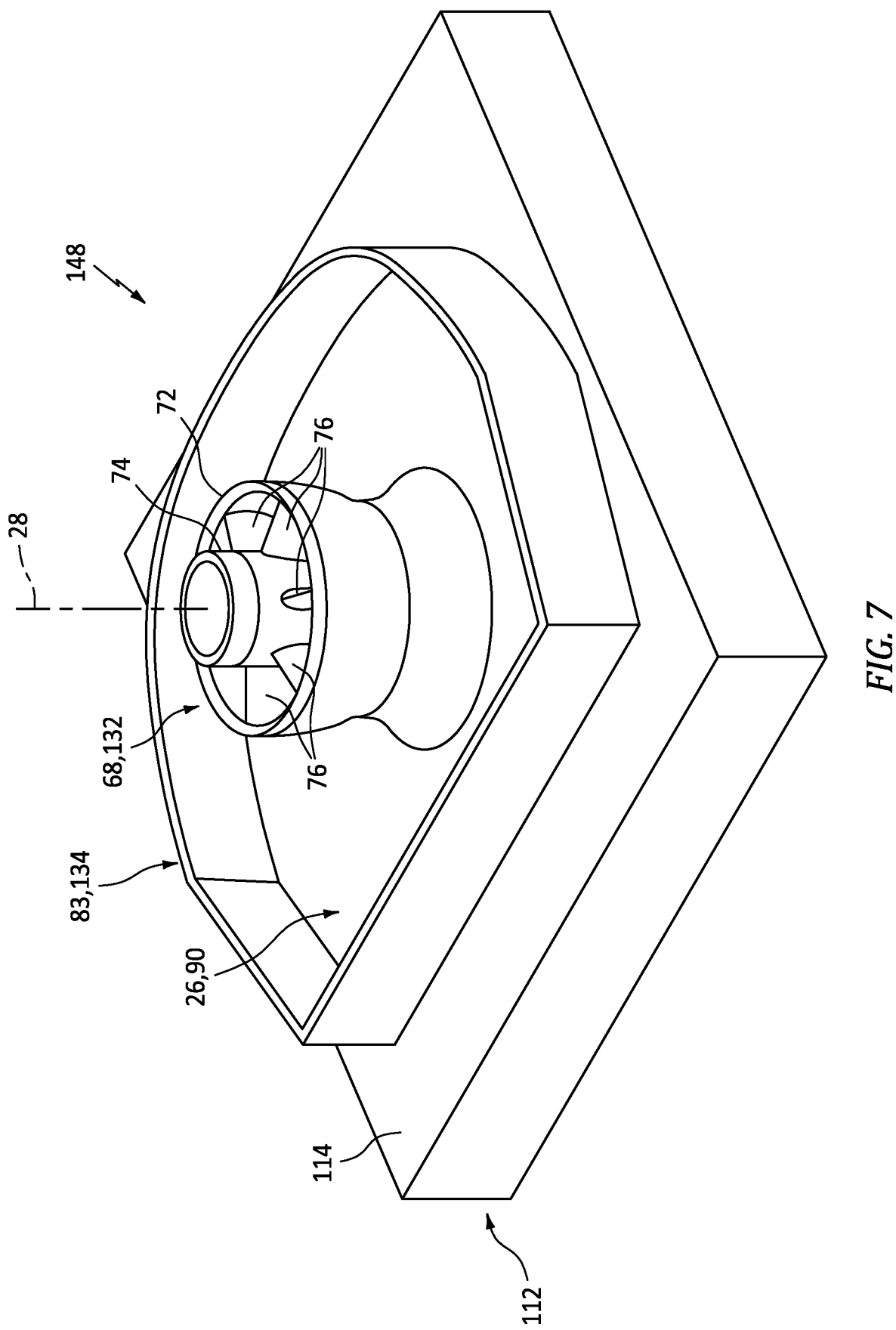
FIGS. 7-9 are perspective illustrations depicting transformation of a component preform into the component.

In step 408, the build plate 112 and the objects 132 and 134 built and fused onto the build plate 112 are removed from the build space 128. Any unsolidified powder is also removed (e.g., evacuated) prior to and/or after removal of the elements 112, 132 and 134 from the build space 128. Referring to FIG. 7, a combination of the build plate 112 and the objects 132 and 134 collectively form a preform 148 of the vehicle component.

Figure 8:
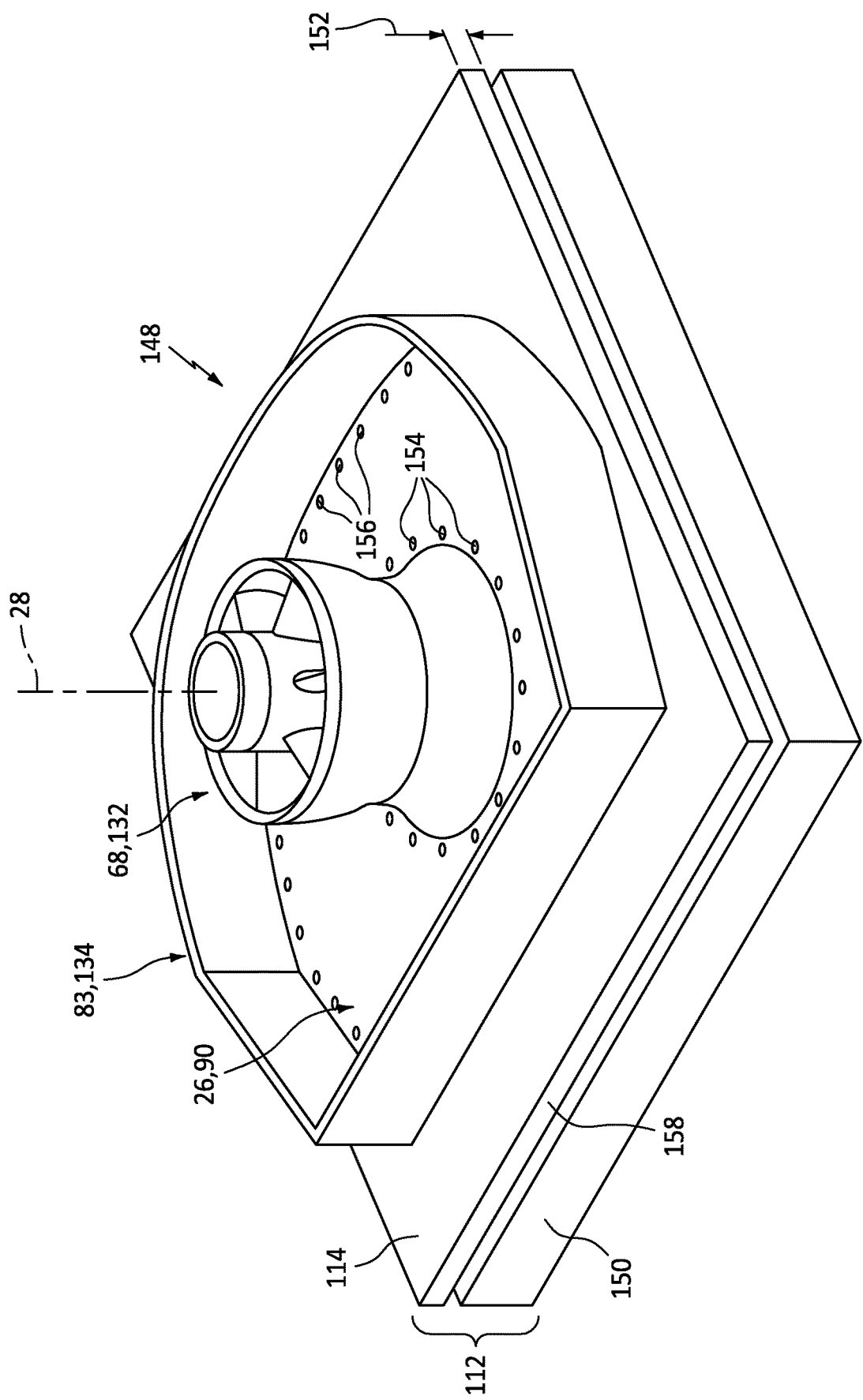
Figure 9:
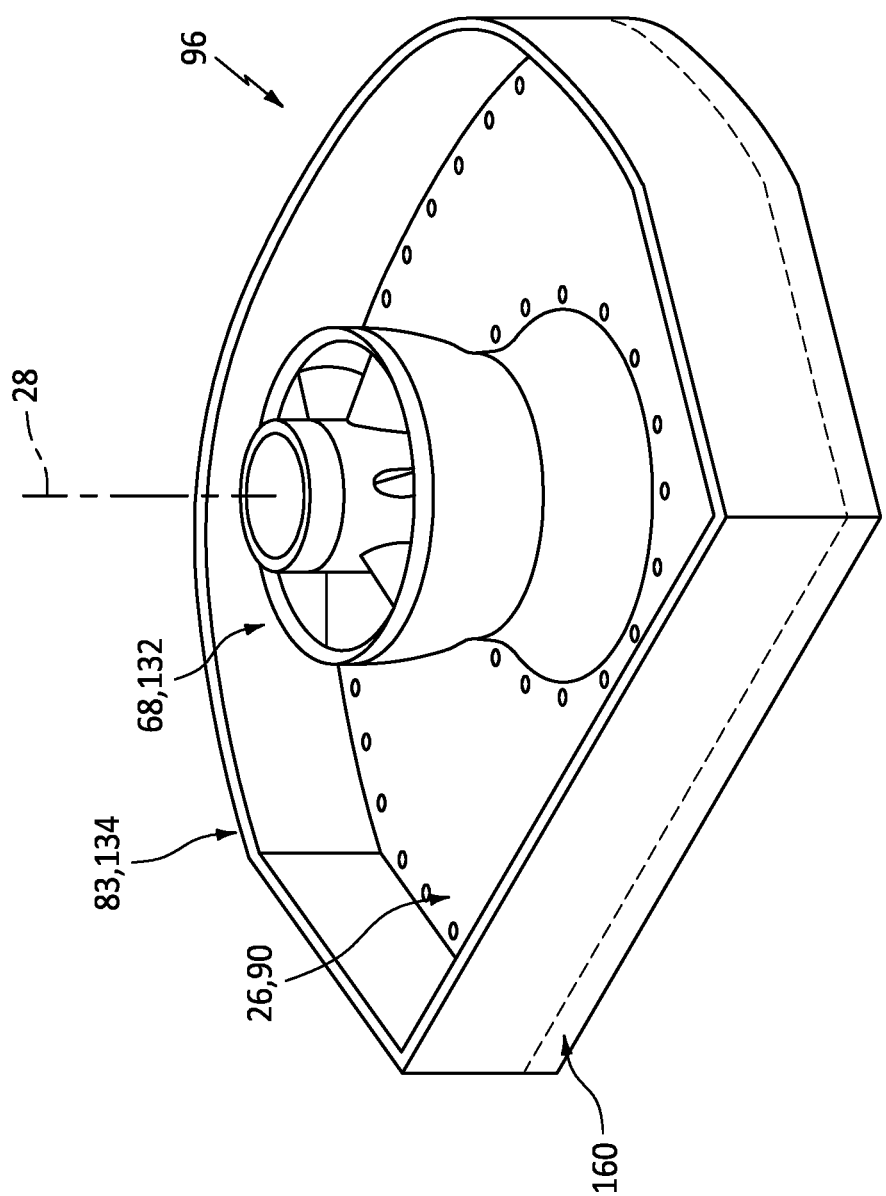

In step 410, the component preform 148 is machined to provide the vehicle component 96. For example, referring to FIG. 8, a bottom portion 150 (e.g., horizontal slice) of the build plate 112 may be removed (e.g., cut off) from the component preform 148 and its build plate 112. This may provide a (e.g., specified) thickness 152 for the support structure 26 being formed. The removed bottom portion 150 of the build plate 112 may also be reclaimed as a new build plate for repeating one or more of the foregoing method steps to build another component preform. One or more fastener apertures 154 and 156 (e.g., bolt holes) may then be formed into a remaining portion 158 of the build plate 112. Referring to FIG. 9, an outer peripheral portion of the remaining portion 158 of the build plate 112 (see FIG. 8) may also be removed (e.g., trimmed off) to form an outer peripheral boundary of the vehicle component 96. With this arrangement, a portion 160 of the original build plate 112 is formed as an integral portion of the vehicle component 96; here, forming the support structure 26.

As described above, the bottom portion 150 of the build plate 112 may be reclaimed as a new build plate for forming another vehicle component 96 using the formation method 400. Of course, after the formation method 400 is repeated some number of times, the build plate 112 used during the formation method 400 may already have the thickness 152 for the support structure 26 being formed. Under such circumstances, the removal of the bottom portion 150 of the build plate 112 may be omitted. This removal may also be omitted where the original build plate 112 is initially sized with the thickness 152 for the support structure 26 being formed.

While the additive manufacturing apparatus 130 is described above as the energy beam powder bed fusion apparatus, the present disclosure is not limited thereto. The additive manufacturing apparatus 130, for example, may alternatively be configured as a stereolithography (SLA) apparatus, a direct selective laser sintering (DSLS) apparatus, an electron beam sintering (EBS) apparatus, an electron beam melting (EBM) apparatus, a laser engineered net shaping (LENS) apparatus, a laser net shape manufacturing (LNSM) apparatus, a direct metal deposition (DMD) apparatus, a direct metal laser sintering (DMLS) apparatus or any other type of additive manufacturing apparatus. Furthermore, while the vehicle component 96 is described above as being formed using the additive manufacturing apparatus 130, it is contemplated the vehicle component 96 may alternatively be formed using one or more other manufacturing processes.

The gas turbine engine 22 is described above as a single spool, radial-flow turbojet turbine engine for ease of description. The present disclosure, however, is not limited to such an exemplary gas turbine engine. The gas turbine engine 22, for example, may alternatively be configured as an axial flow gas turbine engine. The gas turbine engine 22 may be configured as a direct drive gas turbine engine. The gas turbine engine 22 may alternatively include a gear train that connects one or more rotors together such that the rotors rotate at different speeds. The gas turbine engine 22 may be configured with a single spool (e.g., see FIG. 1), two spools, or with more than two spools. The gas turbine engine 22 may be configured as a turbofan engine, a turbojet engine, a turboprop engine, a turboshaft engine, a propfan engine, a pusher fan engine or any other type of turbine engine. In addition, while the gas turbine engine 22 is described above with an exemplary reverser flow annular combustor, the gas turbine engine 22 may also or alternatively include any other type/configuration of annular, tubular (e.g., CAN), axial flow and/or reverser flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A formation method, comprising:
arranging a build plate within a build space;
building a first object onto the build plate within the build space using an additive manufacturing process, the object fused to the build plate during the additive manufacturing process; and
machining at least the build plate to form a component comprising a portion of the build plate and at least a portion of the first object, the machining comprising removing a bottom portion of the build plate from the build plate to provide a second build plate that is discrete from the component.

2. The formation method of claim 1, wherein the building of the object comprises building the first object layer-by-layer onto the build plate using the additive manufacturing process.

3. The formation method of claim 1, wherein the additive manufacturing process comprises a powder bed fusion process.

4. The formation method of claim 1, wherein the building of the first object comprises:
disposing a first layer of powder onto the build plate within the build space; and
selectively solidifying the first layer of powder using an energy beam to form a first portion of the first object that is fused to the build plate.

5. The formation method of claim 4, wherein the building of the first object further comprises:
disposing a second layer of powder within the build space; and
selectively solidifying the second layer of powder using the energy beam to form a second portion of the first object that is fused to the first portion of the first object.

6. The formation method of claim 1, further comprising:
building a second object onto the build plate within the build space using the additive manufacturing process;
the second object fused to the build plate during the additive manufacturing process; and
the component further comprising at least a portion of the second object.

7. The formation method of claim 6, wherein the second object is discrete form the first object.

8. The formation method of claim 6, wherein the build plate structurally connects the second object to the first object.

9. The formation method of claim 6, wherein the second object circumscribes and is spaced radially outboard from the first object.

10. The formation method of claim 6, wherein
the at least a portion of the first object forms a part of a gas turbine engine;
the at least a portion of the second object forms a part of a vehicle body in which the gas turbine engine is housed; and
the portion of the build plate forms a support structure extending between and connected to the gas turbine engine and the vehicle body.

11. The formation method of claim 10, wherein the part of the gas turbine engine comprises an inlet section of the gas turbine engine.

12. The formation method of claim 1, wherein
the at least a portion of the first object forms a part of a gas turbine engine case; and
the portion of the build plate forms a bulkhead projecting radially out from the gas turbine engine case.

13. The formation method of claim 1, further comprising:
arranging the second build plate within the build space;
building a second object onto the second build plate within the build space using the additive manufacturing process, the second object fused to the second build plate; and
machining at least the second build plate to form a second component comprising a portion of the second build plate and at least a portion of the second object.

14. The formation method of claim 1, wherein the machining comprises removing a peripheral portion of the build plate to form an outer peripheral boundary of the component.

15. The formation method of claim 1, wherein the machining comprises forming one or more apertures into the build plate.

16. The formation method of claim 1, wherein
the build plate comprises build plate material; and
the first object comprises object material that is different than the build plate material.

17. The formation method of claim 1, wherein the build plate and the first object comprise a common material.

18. The formation method of claim 1, wherein
an aircraft assembly includes an aircraft body, a gas turbine engine and a support structure;

the gas turbine engine comprises an engine case, and the gas turbine engine is housed within the aircraft body;

the support structure extends between and is connected to the aircraft body and the engine case, the support structure supports the gas turbine engine within the aircraft body, and the support structure and the engine case are included in a monolithic body; and the monolithic body comprises the component.

19. The formation method of claim 18, wherein the engine case forms an outer flowpath wall;

the gas turbine engine further comprises an inner flowpath wall and a plurality of vanes connected to and extending between the inner flowpath wall and the outer flowpath wall; and the inner flowpath wall and the plurality of vanes are included in the monolithic body.

20. The formation method of claim 1, wherein an aircraft assembly includes an intake section for a gas turbine engine and a bulkhead projecting out from the intake section;

the intake section includes an outer flowpath wall, an inner flowpath wall and a plurality of vanes connected to and extending between the inner flowpath wall and the outer flowpath wall;

the bulkhead is formed integral with the intake section as a single, unitary body; and the single, unitary body comprises the component.

\* \* \* \* \*